(12) United States Patent
Reid

(10) Patent No.: US 11,958,536 B2
(45) Date of Patent: Apr. 16, 2024

(54) TRAILER CHASSIS ASSEMBLY

(71) Applicant: Futura IP Limited, Hobsonville (NZ)

(72) Inventor: Glen Reid, Auckland (NZ)

(73) Assignee: FUTURA IP LIMITED, Hobsonville (NZ)

( * ) Notice: Subject to any disclaimer, the term of this patent is extended or adjusted under 35 U.S.C. 154(b) by 0 days.

(21) Appl. No.: 18/309,609

(22) Filed: Apr. 28, 2023

(65) Prior Publication Data

US 2023/0264747 A1    Aug. 24, 2023

Related U.S. Application Data

(63) Continuation of application No. PCT/NZ2021/050193, filed on Nov. 1, 2021.

(30) Foreign Application Priority Data

Oct. 30, 2020 (NZ) ........................................ 769499
Oct. 30, 2020 (NZ) ........................................ 769501

(51) Int. Cl.
  *B62D 21/20* (2006.01)
  *B62D 27/02* (2006.01)
  *B60D 1/48* (2006.01)

(52) U.S. Cl.
  CPC ............. *B62D 21/20* (2013.01); *B62D 27/02* (2013.01); *B60D 1/48* (2013.01)

(58) Field of Classification Search
  CPC ........... B62D 21/20; B62D 27/02; B60D 1/48
  See application file for complete search history.

(56) References Cited

U.S. PATENT DOCUMENTS 3,239,081 A    3/1966 Poleshuk
3,974,924 A *  8/1976 Ullman, Jr. ........... B60P 3/1066
                                              280/414.1
(Continued)

FOREIGN PATENT DOCUMENTS

CN    207565684 U    7/2018
EP      3543088 A1   9/2019
WO   2022093047 A1   5/2022

OTHER PUBLICATIONS

Australian Patent Office, International Search Report for International Application No. PCT/NZ2021/050193, dated Dec. 20, 2021, 3 pages.

(Continued)

*Primary Examiner* — Kevin Hurley
*Assistant Examiner* — Marlon A Arce
(74) *Attorney, Agent, or Firm* — Dinsmore & Shohl LLP

(57) ABSTRACT

An improved trailer chassis assembly primarily constructed from extruded components including an extruded chassis rail component, a cross member component and a connector component. The component has a wall surface defining an interior channel and an opening in the wall surface extending through the wall surface to the interior channel. The connector component has a first region adapted to engage with the interior space of the chassis rail component, and a second region adapted to engage with the cross member component. The interior space of the chassis rail component is adapted to capture movement of the first region of the connector component in vertical and horizontal planes, and yields movement in the axial plane.

21 Claims, 10 Drawing Sheets

(56) References Cited

U.S. PATENT DOCUMENTS

| | | | |
|---|---|---|---|
| 4,464,092 A | 8/1984 | Chambers et al. | |
| 4,997,332 A * | 3/1991 | Johnson | B60P 3/1066 403/385 |
| 6,250,662 B1 * | 6/2001 | Poppell | B60P 3/1066 280/414.1 |
| 9,623,785 B2 * | 4/2017 | Hynd | B60P 3/1033 |
| 2016/0193952 A1 | 7/2016 | Hynd et al. | |

OTHER PUBLICATIONS

Sea Trail Trailers 2020 C-Channel Range [retrieved from internet on Apr. 27, 2023 URL: https://www.seatrailqld.com.au/c-channel-boat-trailers-1 published on Feb. 29, 2020 per Wayback Machine.

* cited by examiner

TRAILER CHASSIS ASSEMBLY

CROSS-REFERENCE TO RELATED APPLICATIONS

This Application is a continuation of PCT International Application PCT/NZ2021/050193, filed Nov. 1, 2021, which claims the benefit of and priority to NZ Patent Application No. 769499, filed on Oct. 30, 2020 and NZ Patent Application No. 769501, filed on Oct. 30, 2020 the entire contents of each of which are hereby incorporated by reference.

INTRODUCTION

Field

The invention generally relates to the field of trailers including those pulled by vehicles, and in particular, to an improved chassis assembly for said trailers.

BACKGROUND

Trailers have long been used for moving loads, large and small, behind vehicles, such as consumer and commercial vehicles. Generally, trailers have one or more sets of wheels that allow the trailer to roll freely behind a towing vehicle. And like vehicles, a deck or load base of a trailer is generally elevated from the ground in order that the trailer has clearance to negotiate obstacles, uneven surfaces, etc.

The deck or load base of a trailer is typically supported by chassis rails and any number of cross members spanning between the rails. A trailer assembly will typically have components including at least two chassis rails which are longitudinally arranged; the one or more sets of wheels will often attach to or otherwise be supported by the chassis rails; and the cross member is attached to the chassis rails to provide stability and rigidity to the chassis. An issue that arises with a trailer assembly with this arrangement of components is that the chassis rails and cross member components must somehow be connected together.

FIG. 1 and FIG. 2 show an example of a prior art boat trailer 5 which suffers from many of the abovementioned issues. The trailer 5 has two chassis rails components 10 that are longitudinally aligned and spaced at a distance. A number of cross member components 20 are shown to span between the two chassis rails. Some cross member components 20 are attached to the chassis rail by a weld 21, and some by a bracket 31. The chassis rail also supports an axle member 40, which attaches by way of brackets 41. The axle member supports a pair of wheels 50. The cross members components 20 support a number of wobble rollers 60 for a boat hull.

One method of the prior art is to weld the cross member component to the chassis rail components. However, there are several issues with this construction technique.

An issue with welding is that care must be taken that the welds are structurally sound. Further, where the chassis is constructed of steel components, care must be taken to protect the steel and welds from corrosion. An issue is that welding of the components also requires a significant portion of the time. An issue is that welding of the components also requires skilled expertise of the welder in order to construct the trailer.

An issue is that, from time to time, it may be desirable to change the location of the cross member to suit the load it is intended to carry and this is particularly circumstantial for boat trailers. If the cross member and chassis rails are welded together, then cutting old welds or connections, re-welding, and potentially corrosion prevention is a substantial undertaking.

Materials which substantially resist corrosion, such as aluminum, can be used to help combat corrosion issues. However, when aluminum suffers an issue with weld fatigue—where welded aluminum components will crack around areas that have been welded. This is in part due to impurities within the metal that pool at the edges of the weld and create a weakened region, leading to fatigue cracking. Therefore welding an aluminum trailer chassis is undesirable.

To address the issues associated with welding, the prior art has implemented bracket and fastener based trailer assemblies. In such assemblies, a bracket it prepared with multiple surfaces adapted to span and complement faces of the chassis rail and cross member components. A hole is then prepared to fasten the bracket to each of the chassis rail and cross member parts.

Issues with bracket-based construction relate to the brackets and the fasteners used to attach them. An issue is that the fasteners add considerable cost to the construction of the trailer. Typically, several fasteners are required to secure each bracket to the chassis rail and cross member, and there are typically several cross members for each trailer. Further, the brackets of the prior art are often parts designs with specific geometries to meet the construction profile of the trailer. To manufacture a bracket, it must first be cut from a blank material, and then the cut blank must be formed into the desired shape. Apertures for fasteners must also be machined into the bracket.

To couple a vehicle to the trailer, a drawbar is provided and will typically connect trailer chassis rails to an attachment coupling. The construction of the drawbar is important and structurally resilient to all towing and maneuvering loads imparted to the trailer chassis by a tow vehicle and the trailer load itself. An issue that arises with a trailer assembly with this arrangement of components is that the chassis rails and drawbar components must somehow be connected together or fabricated. Further, trailer construction of the prior art is that the chassis and drawbar components must be carefully aligned before they are able to be connected together by welding or support brackets and fasteners. There is an issue where alignment of chassis rails and drawbar must be true before connection to ensure the resulting trailer is straight and roadworthy. Often a jig is required to support each component to ensure alignment, further adding to the cost and complexity of trailer construction. Further, use of U-bolts placed around the drawbar is not aesthetically pleasing. For a consumer who invests significantly into their car or boat for which the trailer is used, the appearance of the trailer can be an important factor in determining product suitability.

The trailer further has a drawbar region 30, which is formed by the merging of the two chassis rail components 10. The drawbar region 30 is created by welding the merged cross member components together. To facilitate welding of these components, a jig is required to prepare and maintain the alignment. Once the drawbar has been constructed, a winch platform 47 may be attached. Further, a trailer coupling component 46 is attached. Further, a jockey wheel component 45 is attached.

FIG. 3 shows a prior art trailer which suffers from such issues, including multiple brackets with complex geometries and surface contours, and multiple fasteners to connect the cross member, brackets and chassis rail together.

Further, trailer construction of the prior art is that the chassis and cross member components must be carefully aligned before they are able to be connected together by welding or support brackets and fasteners. There is an issue where alignment of chassis rails and cross members must be true before connection to ensure the resulting trailer is straight and roadworthy. Often a jig is required to support each component to ensure alignment. For a boat trailer, the cross members are often shaped to provide hull clearance about the center of the trailer. An issue is that any jig to support boat trailer construction must allow for a variety of cross member shapes.

Accordingly, there is a need to solve or at least ameliorate the abovementioned issues, or at least to provide the public with a useful choice.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

SUMMARY

Aspects described herein relate to a trailer chassis assembly comprising: an extruded chassis rail component, the component comprising a wall surface defining an interior space and an opening in the wall surface extending through the wall surface to the interior channel; a cross member component; a connector component comprising: a first region adapted to engage with the interior space of the chassis rail component, and a second region adapted to engage with the cross member component wherein the interior space of the chassis rail component is adapted to capture movement of the first region of the connector component in vertical and horizontal planes, and yields movement in the axial plane.

Another aspect provides a trailer chassis assembly comprising: an extruded chassis rail component, the component comprising a wall surface defining an interior space and an opening in the wall surface extending through the wall surface to the interior channel; a cross member component; a connector component comprising: a first region adapted to engage with the interior space of the chassis rail component, and a second region adapted to engage with the cross member component.

In some embodiments, the interior space of the chassis rail component extends longitudinally to a channel opening disposed at, at least, one end.

In some embodiments, the connector component is a section of extrusion.

In some embodiments, the cross member component is a section of extrusion.

In some embodiments, the connector region configured for engagement with the cross member component is adapted to extend through the opening in the chassis rail to thereby engage with the cross member.

In some embodiments, the chassis rail component comprises a rear vertical wall, a top lateral wall, a bottom lateral wall, and first and second wall sections extending vertically together from each of the top wall and the bottom wall, the first and second wall sections defining the opening to the interior space.

In some embodiments, the first region of the connector component is adapted to engage with the top lateral wall, bottom lateral wall, and the first and second wall sections.

In some embodiments, the second region of the connector component is adapted to extend through the opening from the interior space for engagement with the cross member component.

In some embodiments, the outer profile of the first region of the connector component is substantially complementary to a profile of the inner surface of the chassis rail.

In some embodiments, the outer profile of the second region of the connector component is adapted for engagement with the cross member component.

In some embodiments, the outer profile of the first region of the connector component is substantially adapted for lateral and vertical engagement with the inner surface of the chassis rail component, yet adapted for free longitudinal movement about the interior space of the chassis rail component.

In some embodiments, the outer profile of the first region of the connector component is adapted to interlock with the chassis rail component in the lateral and vertical axes.

In some embodiments, the second region of the cross member engaging region of the connector is complementary to a profile of the inner surface of the cross member.

In some embodiments, the chassis assembly comprises: two laterally opposed chassis rail components; and one or more cross member components adapted to span between the two laterally opposed chassis rail components.

In some embodiments, the assembly further comprises a first fastener adapted to secure the connector component to the chassis rail component.

In some embodiments, the assembly further comprises a second fastener adapted to secure the connector component to the cross member component.

In some embodiments, the in axial profile of the interior of the chassis rail component substantially matches the axial profile of the exterior of the connector region configured for engagement with the chassis rail component.

In some embodiments, the axial profile comprises at least one vertical support surface interspersed between horizontally orientated support surfaces.

In some embodiments, the axial profile comprises at least one horizontal support surface interspersed between vertically orientated support surfaces.

In some embodiments, the cross member component comprises a substantially tubular form with a hollow interior adapted to receive at least part of the connector component.

In some embodiments, the trailer chassis assembly further comprises the pair of extruded chassis rail components arranged with at least one abutting surface; and a drawbar connector component configured to concentrically engage the pair of chassis rail components so as to laterally and vertically stabilize the chassis rail components.

In some embodiments, the drawbar connector component is a section of extrusion.

In some embodiments, the drawbar connector component comprises a hollow interior configured to concentrically engage with an outer surface of the pair of chassis rail components.

In some embodiments, the pair of chassis components each comprise an a substantially open interior profile and an opening disposed on the lateral plane such that when the pair of chassis rail components are placed in an opposing arrangement with an abutment of channel openings, an interior tunnel with a profile is created, and the drawbar connector component has an outer surface form configured to engage with the interior tunnel profile so as to laterally and vertically stabilize the chassis rail components.

In some embodiments, the chassis rail component comprises a rear vertical wall, a top lateral wall, a bottom lateral wall, and first and second wall sections extending vertically together from each of the top wall and the bottom wall, the first and second wall sections defining the channel opening.

In some embodiments, the pair of extruded chassis rail components each comprise a substantially open interior profile and at least one vertically orientated inward projection, the components configured to abut to thereby define an longitudinally extending interior tunnel with a profile; and an extruded drawbar connector component comprising an exterior profile having an inset configured to receive the vertically orientated projections, and substantially conforming to the interior profile of the tunnel and the at least one vertically orientated inward projection of each pair of extruded chassis rail components.

In some embodiments, each chassis rail component comprises an interior profile comprising two or more inward projections disposed on the vertical plane, and the drawbar connector component comprises an outer profile having a recess adapted to receive the inward projections of the chassis rail components.

In some embodiments, each chassis rail component, and the connector component, comprise a complementary key profile so as to allow relative longitudinal movement between each chassis rail component, and the connector component, and substantially resist movement in a vertical and horizontal direction.

In some embodiments, the key profile comprises: a protrusion located on an interior surface of each chassis rail component, the protrusion extending inward to the interior channel; and a depression located on the exterior surface of the drawbar connector component adapted to receive the protrusion of each chassis rail component.

Another aspects provides a trailer chassis assembly comprising: a pair of extruded chassis rail components arranged with at least one abutting surface; and a drawbar connector component configured to concentrically engage the pair of chassis rail components so as to laterally and vertically stabilize the chassis rail components.

In some embodiments, the drawbar connector component is a section of extrusion.

In some embodiments, the drawbar connector component comprises a hollow interior configured to concentrically engage with an outer surface of the pair of chassis rail components.

In some embodiments, the pair of chassis components each comprise an a substantially open interior profile and an opening disposed on the lateral plane such that when the pair of chassis rail components are placed in an opposing arrangement with an abutment of channel openings, an interior tunnel with a profile is created, and wherein the drawbar connector component has an outer surface form configured to engage with the interior tunnel profile so as to laterally and vertically stabilize the chassis rail components.

In some embodiments, the chassis rail component comprises a rear vertical wall, a top lateral wall, a bottom lateral wall, and first and second wall sections extending vertically together from each of the top wall and the bottom wall, the first and second wall sections defining the channel opening.

In some embodiments, the pair of extruded chassis rail components each comprise a substantially open interior profile and at least one vertically orientated inward projection, the components configured to abut to thereby define an longitudinally extending interior tunnel with a profile; and an extruded drawbar connector component comprising an exterior profile having an inset configured to receive the vertically orientated projections, and substantially conforming to the interior profile of the tunnel and the at least one vertically orientated inward projection of each pair of extruded chassis rail components.

In some embodiments, each chassis rail component comprises an interior profile comprising two or more inward projections disposed on the vertical plane, and the drawbar connector component comprises an outer profile having a recess adapted to receive the inward projections of the chassis rail components.

In some embodiments, each chassis rail component, and the connector component, comprise a complementary key profile so as to allow relative longitudinal movement between each chassis rail component, and the connector component, and substantially resist movement in a vertical and horizontal direction.

In some embodiments, the key profile comprises: a protrusion located on an interior surface of each chassis rail component, the protrusion extending inward to the interior channel; and a depression located on the exterior surface of the drawbar connector component adapted to receive the protrusion of each chassis rail component.

Another aspect provides a trailer chassis assembly comprising: an extruded chassis rail component, the component comprising: an exterior wall defining an interior channel and a longitudinally extending opening from the interior to an exterior, and an axially disposed opening to the interior channel; a cross member component; an extruded connector component comprising: a connector region engaged with the chassis rail component, and a connector region engaged with the a cross member component; and wherein the internal channel is adapted to receive the connector component region configured for engagement with the chassis rail component through the axially disposed opening to thereby allow free movement of the connector within the interior channel; and wherein the connector region configured for engagement with the a cross member component is adapted to extend through the opening in the chassis rail to thereby engage with the cross member.

Another aspect provides a chassis components for a trailer assembly comprising: an extruded chassis rail component, the component comprising: an exterior wall defining an interior channel and a longitudinally extending opening from the interior to an exterior, and an axially disposed opening to the interior channel; a cross member component; an extruded connector component comprising: a connector region configured for engagement with the chassis rail component, and a connector region configured for engagement with the a cross member component; and wherein the internal channel is adapted to receive the connector component region configured for engagement with the chassis rail component through the axially disposed opening to thereby allow free movement of the connector within the interior channel; and wherein the connector region configured for engagement with the a cross member component is adapted to extend through the opening in the chassis rail to thereby engage with the cross member.

In some embodiments, the outer profile of the chassis rail engaging region of the connector is complementary to the profile of the inner surface of the chassis rail.

In some embodiments, the outer profile of the chassis rail engaging region of the connector and inner profile of the channel of the chassis rail is such that an interlocking arrangement is created, thereby providing free longitudinal movement within the channel of the rail, yet substantially resist lateral or axial movement.

In some embodiments, the outer profile of the cross member engaging region of the connector and inner profile of the channel of the chassis rail are longitudinally complementary, thereby providing free longitudinal movement of the cross member engaging region within the channel of the chassis rail, and vertically and laterally noncircular so as to substantially resist lateral or axial movement.

In some embodiments, the outer profile of the cross member engaging region of the connector is complementary to the profile of the inner surface of the cross member.

In some embodiments, the cross member component is configured to extend between at least two chassis rail components.

In some embodiments, the components further comprise a first fastener adapted to secure the extruded connector component to the chassis rail component.

In some embodiments, the components further comprise a second fastener adapted to secure the extruded connector component to the cross member component.

In some embodiments, the in axial profile of the interior of the chassis rail component substantially matches the axial profile of the exterior of the connector region configured for engagement with the chassis rail component.

In some embodiments, the axial profile comprises at least one vertical support surface interspersed between horizontally orientated support surfaces.

In some embodiments, the axial profile comprises at least one horizontal support surface interspersed between vertically orientated support surfaces.

The following embodiments may relate to any of the above aspects. Other aspects of the invention may become apparent from the following description, which is given by way of example only and with reference to the accompanying drawings.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification that include that term, the features, prefaced by that term in each statement or claim, all need to be present but other features can also be present. Related terms such as "comprise" and "comprised" are to be interpreted in the same manner.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The invention will now be described by way of example only and with reference to the drawings in which.

DETAILED DESCRIPTION

Figure 1:
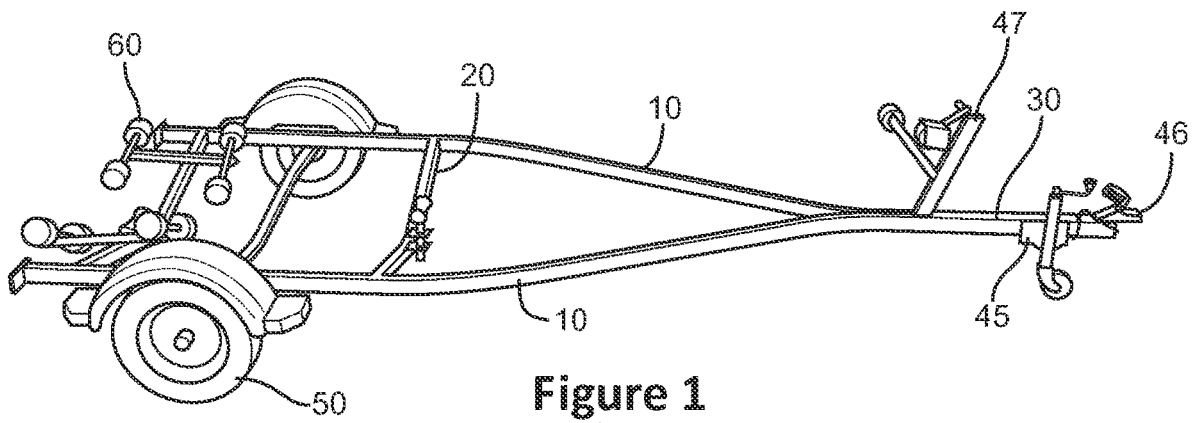
FIG. 1 shows a prior art boat trailer.
Figure 2:
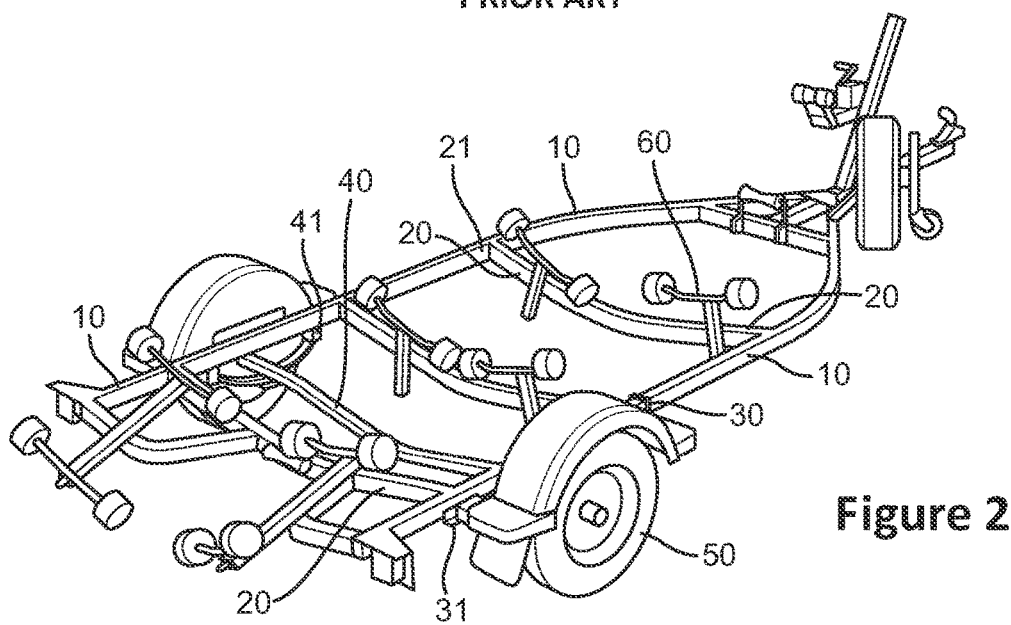
FIG. 2 shows another prior art boat trailer.
Figure 3:
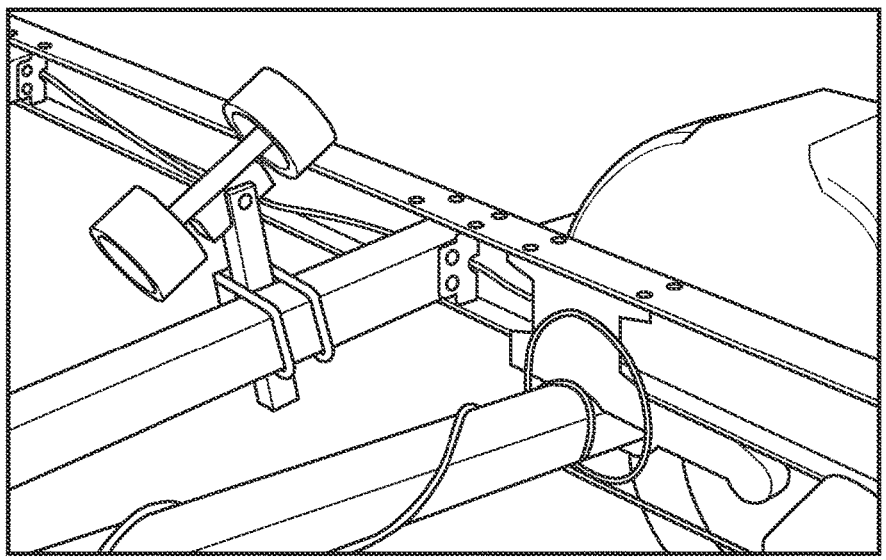
FIG. 3 shows another prior art boat trailer.

Disclosed herein are trailer chassis construction components that improve upon the performance of existing trailer designs. One performance consideration is the cost to produce the trailer, which is in determined by factors including the cost of materials, the cost of construction, and the cost of shipping or transportation. Each of these factors contributes to the total cost to deliver an assembled trailer to a consumer.

The cost of shipping or transportation is determined by factors including the cost of shipping a complete trailer between a manufacturer and consumer, and additionally, the cost of shipping materials, or partly assembled trailers between a location of manufacture or part-assembly, and the consumer. Further, components of a trailer may be partially-assembled in one location, and the assembly completed at another location. This is common where materials may be supplied to one location for crafting and machining into product-ready components, and another location where the final assembly of those components into a completed trailer takes place. Shipping costs are therefore of increasing importance for any trailer manufacturer who desires to provide consumers with their product beyond what would be ordinarily locally convenient transportation distance. Shipping costs of trailer assemblies, partly assembled trailers, and material to product trailer components therefore contribute significantly to the total cost of a consumer ready item, and may curtail trailer manufacturers from reaching a geographically larger consumer base while remaining cost effective.

In the trailer manufacturing industry, the cost to ship an assembled trailer long distance, such as overseas or by methods which do not include towing the trailer, are cost prohibitive and generally curtail a business to selling in areas where delivery distance is convenient. This is because a consumer is unlikely to pay the cost to ship a trailer long distance when there may be an alternative option to purchase a locally constructed trailer, which do not incur such costs. These factors mean that the trailer construction industry is typically confined to serving a local or geographically curtailed customer base.

There is a desire to improve the cost effectiveness of delivering a trailer product beyond local or geographically restricted areas. One way to improve this is to improve the ability to ship many trailers long distance while requiring minimal shipping space. One way to minimize shipping space for long distances is to 'flat-pack' shipping of parts between manufacturers and assemblers, and assemblers and consumers. Another way is to optimize the use of extruded parts, which are typically cost effective to ship.

Embodiments described herein relate to an improved trailer chassis that comprises an assembly of components, which enable efficient flat pack shipping. Embodiments described herein facilitate such improvements in trailer chassis components being constructed from extrusion-based materials. Such components facilitate improvements in the areas of cost of materials, the cost of assembly, and/or the cost of shipping or transportation.

Certain embodiments relate to trailer chassis assembly that has chassis rails, cross members joining the chassis rails, and optionally, the chassis rails shaped to form a drawbar region. To attach the cross members to the chassis rails, a connector is provided. To stabilize the drawbar region of the chassis rails, a drawbar connector is provided. In some embodiments, each of the chassis rails, connector, and drawbar connector are produced from extruded parts that are configured to fit together with a tight form, and stabilize the resulting trailer chassis assembly. The extrusion-based parts are cost effective to produce and transport. Further, the extruded parts have complementary fit as will be explained further. This allows for substantial manufacturing efficiency, ease, and cost improvements.

In some embodiments, the trailer chassis has a pair of extruded chassis rail components, each rail component has a wall surface defining an interior space and an opening in the wall surface extending through the wall surface to the interior channel. The trailer chassis also has a number of cross member components. To connect each cross member to the chassis rail, some embodiments have a connector component which spans between a chassis rail and the cross member and serves as a structural joining component. The chassis rail has a wall opening allows the connector component to engage with the interior of the chassis rail, and the pass through the opening to also engage with the cross member component. To facilitate these connections, the connector component has a first region adapted to engage with the interior space of the chassis rail component, and a second region adapted to engage with the cross member component.

The chassis rails are primarily an extruded form. This means they are produced by a metal extruding process, yet may have further manufacturing steps applied to create their final form, such as bending to a desired shape, and machining of holes or similar for fastener pass through. The extruded profile of preferred chassis rail components is C-shaped, such that there are sidewalls substantially enveloping and defining an interior space of the chassis rail component that extends longitudinally. For example, the chassis rail component comprises a rear vertical wall, a top lateral wall, a bottom lateral wall, and first and second wall sections extending vertically together from each of the top wall and the bottom wall, the first and second wall sections defining the opening to the interior space. Openings to the chassis rail interior can be found at each end of the rail, and through the sidewall opening.

To form an engagement between the connector and chassis rail, the region of the connector configured for engagement with the cross member component is adapted to extend through the opening in the chassis rail to thereby engage with the cross member. The first region of the connector component is adapted to engage with the top lateral wall, bottom lateral wall, and the first and second wall sections. The second region of the connector component is adapted to extend through the opening from the interior space for engagement with the cross member component. To improve this connection, the outer profile of the first region of the connector component may be substantially complementary to a profile of the inner surface of the chassis rail. In this way, where the profiles have noncircular shapes, a mechanical engagement is provided between connecting parts, and those parts substantially resist rotational movement to stabilize the connection. In this way, the outer profile of the first region of the connector component is substantially adapted for lateral and vertical engagement with the inner surface of the chassis rail component, yet adapted for free longitudinal movement about the interior space of the chassis rail component.

Further, the outer profile of the second region of the connector component is adapted for engagement with the cross member component. The outer profile of the first region of the connector component may therefore be adapted to interlock with the chassis rail component in the lateral and vertical axes. To facilitate this, the second region of the cross member engaging region of the connector is complementary to a profile of the inner surface of the cross member. For example, the axial profile of the interior of the chassis rail component substantially matches the axial profile of the exterior of the connector region configured for engagement with the chassis rail component. In some embodiments, the axial profile comprises at least one vertical support surface interspersed between horizontally orientated support surfaces, and the axial profile comprises at least one horizontal support surface interspersed between vertically orientated support surfaces. For the cross member component to form a good connection with the connector, a substantially tubular form with a hollow interior is ideal, and the form complimentary so as to receive at least part of the connector component with a snug fit.

In preferred embodiments, the chassis rail components are shaped to form a nose that provides the drawbar region of the trailer chassis assembly. The chassis rails are bought together such that they have abutting surfaces. In preferred forms of the chassis rails, each rail has a side that is at least partly open, and those partly open sides are bought together at the nose to form an enclosed interior. To mechanically secure the two chassis rails together in the drawbar region, a drawbar connector component is provided to concentrically engage with the nose formed by the pair of chassis rail components. The drawbar connector component acts as to laterally and vertically stabilize the chassis rail components. The concentric engagement means that the drawbar connector component engages with the chassis rails along a longitudinal trailer axis where it may freely be moved.

As mentioned the pair of chassis components each comprise a substantially open interior profile and an opening disposed on the lateral plane such that when the pair of chassis rail components are placed in an opposing arrangement with an abutment of channel openings, an interior tunnel with a profile is created. The drawbar connector component has an outer surface form configured to engage with the interior tunnel profile so as to laterally and vertically stabilize the chassis rail components. The drawbar connector is preferably an extrusion-based component that has a profile matched to the profile of the abutting pair of chassis rails. In this way, a section of the extrusion can be cut from an extrusion length according to a desired length to thereby create the component.

As mentioned above, the chassis rail component has a rear vertical wall, a top lateral wall, a bottom lateral wall, and first and second wall sections extending vertically together from each of the top wall and the bottom wall, the first and second wall sections defining the channel opening. The drawbar connector exterior profile is complementary to the profile created by the channel opening.

In some embodiments, the drawbar region of the trailer chassis assembly is constructed by the pair of extruded chassis rail components that each have a substantially open interior profile and at least one vertically orientated inward projection, wherein the chassis rail components are configured to abut and to thereby define a longitudinally extending interior tunnel with a profile. The drawbar connector component comprising an exterior profile having an inset configured to receive the vertically orientated projections, and substantially conforming to the interior profile of the tunnel and the at least one vertically orientated inward projection of each pair of extruded chassis rail components.

To aid with the connection of the chassis rails and drawbar connector component, each chassis rail component comprises an interior profile comprising two or more inward projections disposed on the vertical plane, and the drawbar connector component comprises an outer profile having a recess adapted to receive the inward projections of the chassis rail components. The inward projections form a barrier to lateral separation of the chassis rail components once the drawbar connector has been inserted.

In some embodiments, each chassis rail component, and the connector component, have a complementary key profile so as to allow relative longitudinal movement between each chassis rail component, and the connector component, and substantially resist movement in a vertical and horizontal direction. Many forms are possible which achieve the mechanical stabilization of the chassis rails. For example, these forms include a key profile that has a protrusion located on an interior surface of each chassis rail component, the protrusion extending inward to the interior channel, and a depression located on the exterior surface of the drawbar connector component adapted to receive the protrusion of each chassis rail component.

In a varied embodiment, the drawbar connector component comprises a hollow interior configured to concentrically engage with an outer surface of the pair of chassis rail components. This means the drawbar connector envelopes the exterior surface of the chassis rails in the drawbar region.

In an exemplary embodiment, the trailer chassis assembly has an extruded chassis rail component where there is an interior wall surface that defines an interior space. There is an opening in the wall surface that extends from the exterior to the interior. The opening allows a connector component of the assembly to reside inside the interior space, held horizontally and vertically captive by the geometry of the connector and interior space, yet the interior yields free moment of the connector in the axial plane, that is, along the length of the chassis rail component. The connector component has a first region adapted to engage with the interior space of the chassis rail component, and a second region adapted to engage with a cross member component. The interior space of the chassis rail component is preferably adapted to capture movement of the first region of the connector component in vertical and horizontal planes, and yields movement in the axial plane.

Figure 4:
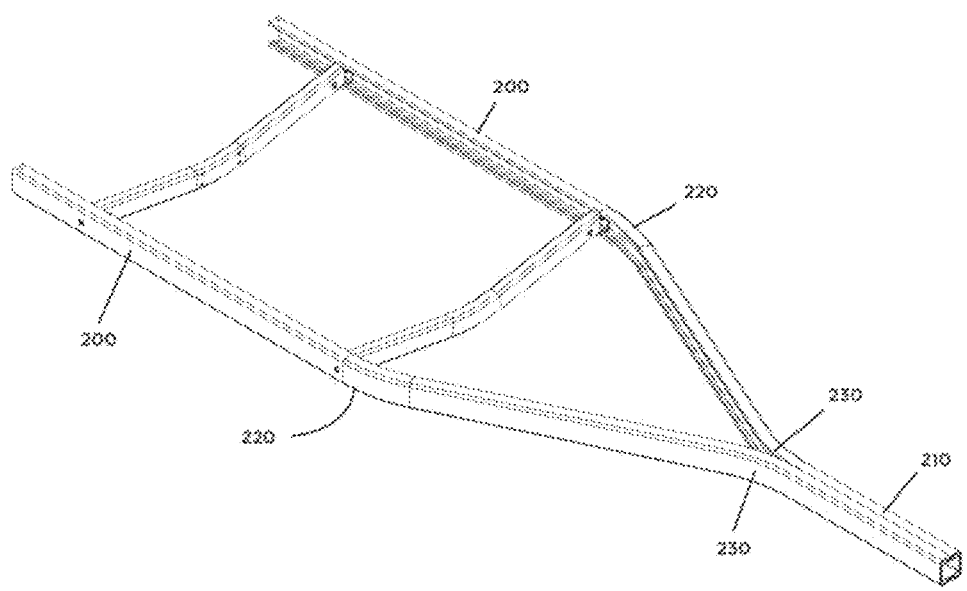
FIG. 4 shows a front isometric view of an exemplary embodiment of an assembled trailer chassis.
Figure 5:
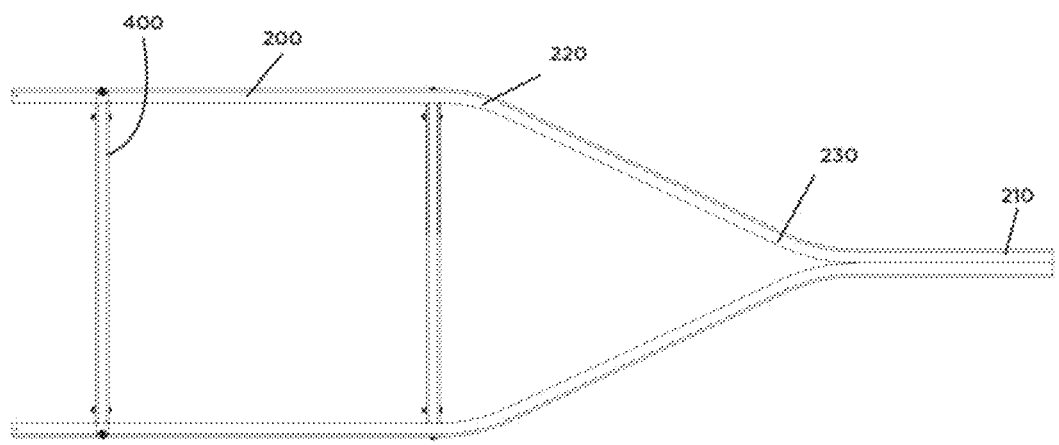
FIG. 5 shows a top view of the chassis of FIG. 4.
Figure 6:
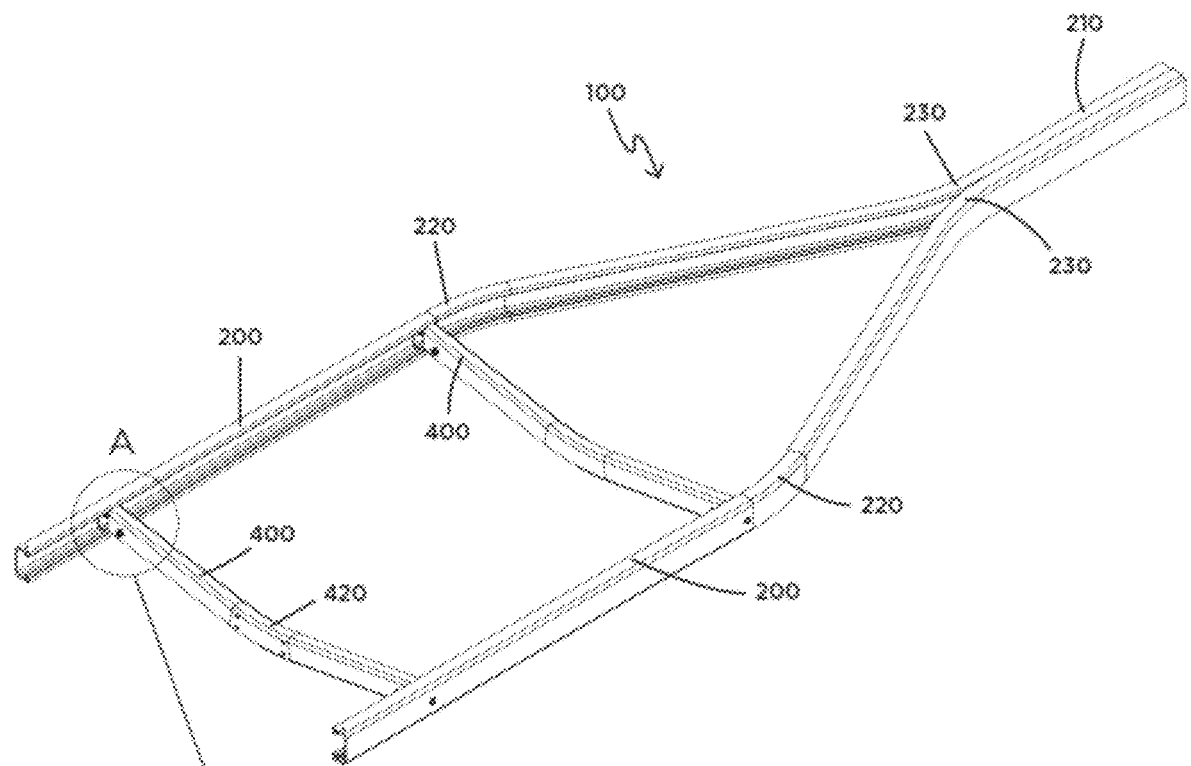
FIG. 6 shows a rear isometric view of an exemplary embodiment of an assembled trailer chassis.

Particular features of an exemplary chassis assembly will now be described with reference to FIGS. 3-24. FIGS. 4-6 show views of an exemplary embodiment of a trailer chassis assembly constructed from primarily extruded components. The chassis comprises primary components including a pair of longitudinally arranged chassis rails 200. The chassis rails 200 comprise a first inward bend 220, and a second outward bend 230 so as to shape the chassis rails into a drawbar connection region 210. Such bends may be applied to an extrusion by a mandrel bending technique. In this way, the chassis rails may be constructed from a continuous length of extrusion. Further, the chassis rails may be shaped to provide the trailer drawbar, often a separately attached component.

A plurality of cross member components 400 are connected to span between the chassis rail components to provide lateral support for and rigidity to the assembly. In some embodiments, the cross member components are adapted for the intended trailer purpose. For example, the cross member component 400 has an angular bracket adapted to segment the cross member into two regions which provide clearance for a boat hull. Other forms of the cross member component are possible as may be dictated by the intended purpose of the trailer. For example, cross member components that have a substantially flat upper surface may be used to support a flat trailer deck.

Figure 7:
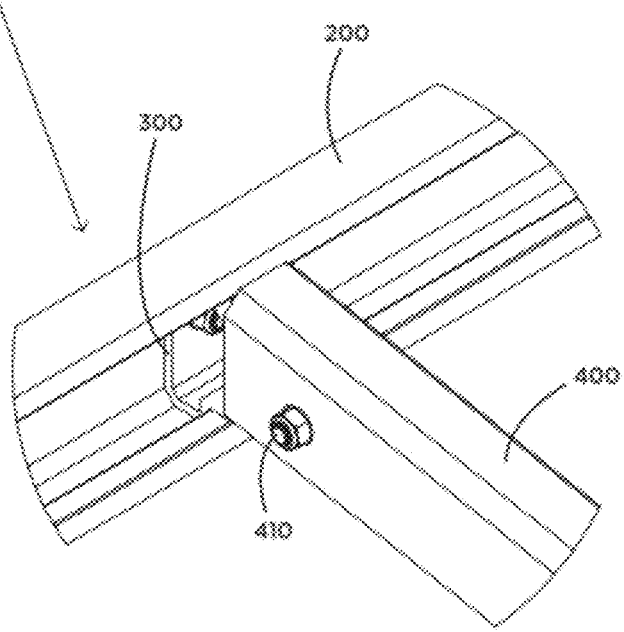
FIG. 7 shows a close up isometric view of the region A from FIG. 6.

FIG. 7 shows a close up isometric view of the region A from FIG. 6. In particular, FIG. 7 shows a coupling component 300 that connects between the chassis rail component 200 and a cross member component 400. A fastener 410 is provided to lock the connector component 300 to the cross member component 400. In some embodiments, an adhesive, or weld may be used to secure or supplement connection of the connector component to the cross member and/or chassis rail components.

Figure 8:
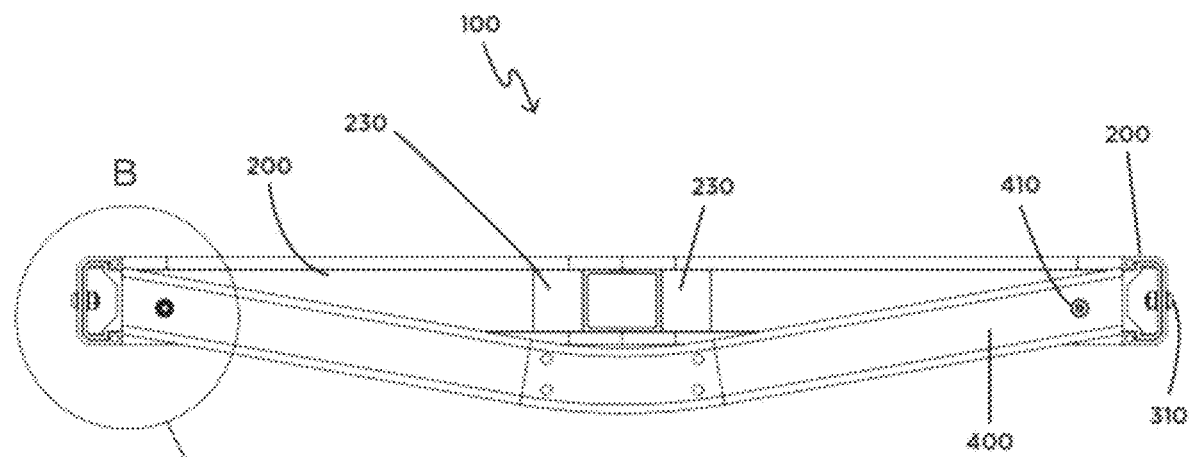
FIG. 8 shows a rear end view of the chassis of FIGS. 4-6.
Figure 9:
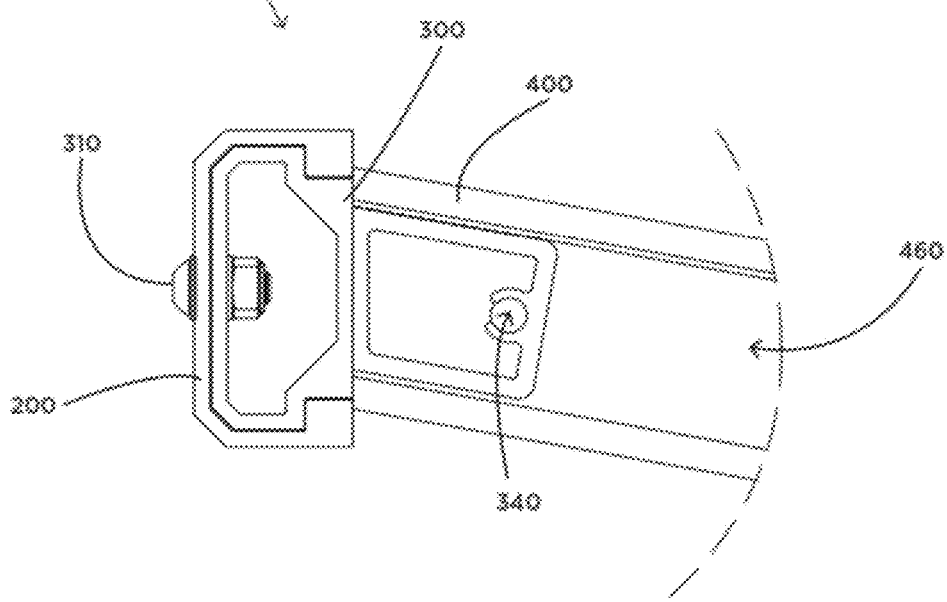
FIG. 9 shows a close up and cross section view of the region B from FIG. 8.

FIG. 8 shows a rear end view of the chassis 100 and FIG. 9 shows a close up and cross section view of the region B. In particular, FIG. 9 shows the connector component 300 with a first region partly received within the chassis rail component 200 and second region partly received within the cross member component 400.

The chassis rail component 200 comprises a longitudinally extending internal channel shaped to accept part of the connector component 300. In the depicted example, the cross member has a hollow interior and the second region of the connector component is shaped complimentary to the interior. However, the cross member component may have other forms such as an I-beam or H-beam profile, or any other profile suitable to provide adequate structural strength. The connector component may be configured to attach by way of bracing against the side of such profiles, and be held together by passing a fastener or similar through the braced components. It is desirable however, that the connector component and cross member component share at least two complimentary surfaces such that mechanical stability is provided from the engagement of the complimentary surfaces and not the fastener alone.

Similarly, the cross member component comprises a laterally extending internal channel shaped to accept a part of the connector component 300. In this way, the connector component spans between the chassis rail component and cross member component. The profile of the cross member component is preferably such that the connector component is substantially mechanically supported by mechanical engagement between the components. In the depicted example, the chassis component is C-shaped, and the connector component is shaped complimentary to the interior of the chassis component. However, the connector component may equally have an aperture be shaped to receive the exterior surface of the chassis rail component. In each embodiment, the connector component is axially threaded with the chassis rail component, and forms a lateral and vertical mechanical engagement to stabilize the assembly.

Figure 10:
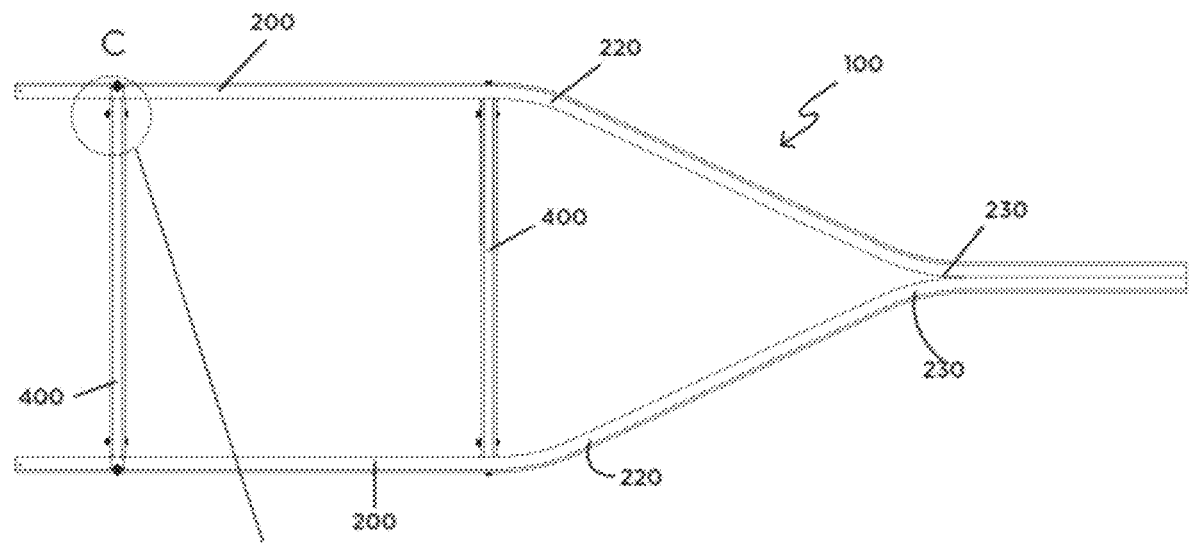
FIG. 10 shows a top view of the chassis of FIG. 4-6.
Figure 11:
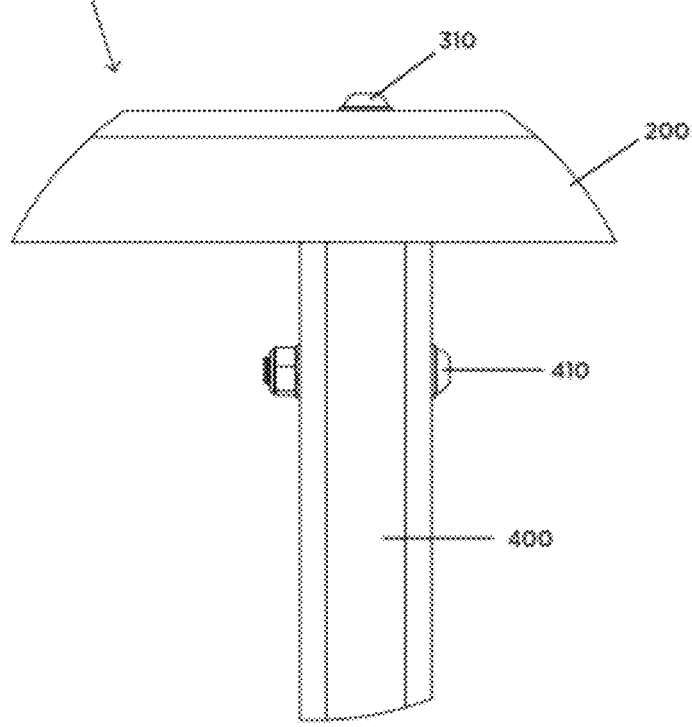
FIG. 11 shows a close up view of the region C from FIG. 10.

FIG. 10 shows a top view of the chassis 100 and FIG. 11 shows a close up view of the region C. In some embodiments, a first fastener 310 is configured to lock the chassis rail and connector together. In some embodiments, a second fastener 410 is configured to lock the connector and cross member together. In some embodiments, the connector component 300 includes a receptacle 340 adapted to accept the second fastener 410 and prevent lateral movement once the fastener is engaged between the connector and cross member components.

Figures 12, 13:
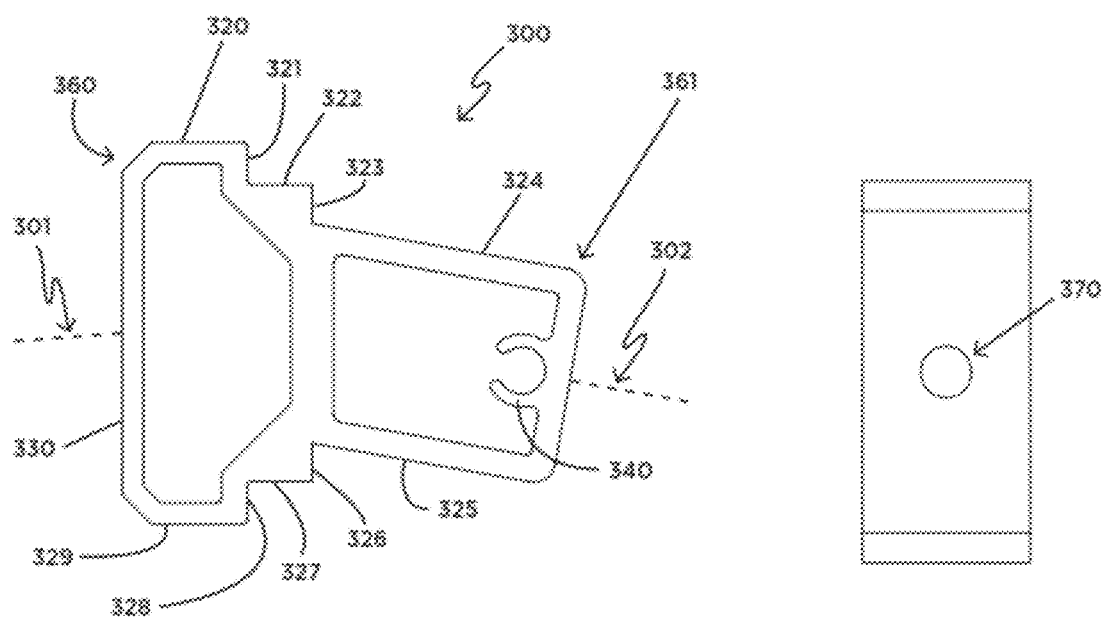
FIG. 12 shows an end view and cross section of the connector component.
FIG. 13 shows an end view of the chassis rail engaging portion of the connector component.
Figures 14, 15:
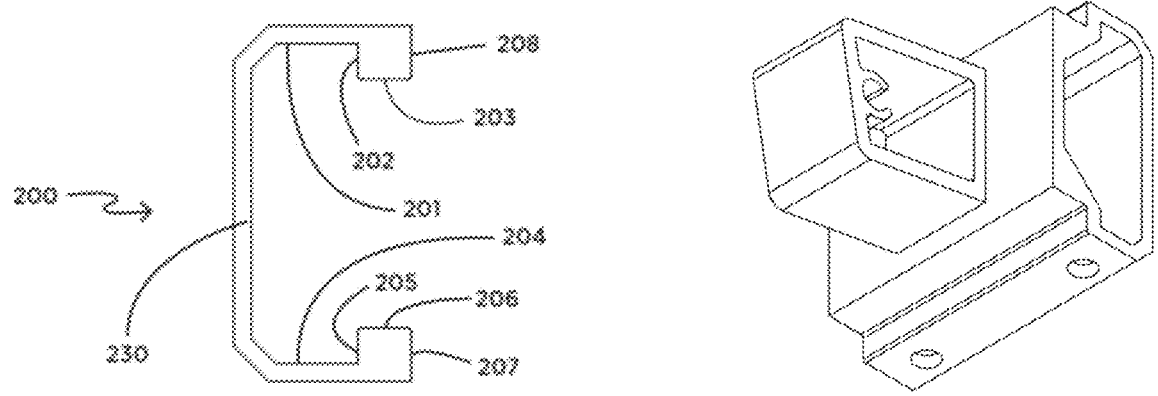
FIG. 14 shows an end view and cross section of the chassis rail component.
FIG. 15 shows an alternative exemplary connector component.

FIG. 12 shows an end view and cross section of the connector component 300 that includes the first chassis rail engaging region 360 and the second cross member engaging region 361. FIG. 13 shows an end view of the chassis rail engaging portion 360 including aperture 370 which can be machined into connector component 300 to allow the fastener 310 to pass through to lock the chassis rail component 200 and the connector component 300. FIG. 14 shows an end view and cross section of the chassis rail component 200.

The chassis rail engaging portion 360 of the connector component 300 is shaped to have an external profile that substantially matches an internal profile of the chassis rail component 200. In this way, the chassis rail engaging portion 360 of the connector component 300 is shaped to fit within the internal region of the chassis rail component 200.

In this way, an interlocking engagement is created between the chassis rail component 200 connector component 300.

The chassis rail engaging portion 360 comprises a profile with surfaces configured to bear assembly loads, help alignment of components during an assembly process, and mechanically stabilize at least the joint created by the interlocking of the chassis rail component 200 connector component 300. Similarly, internal surfaces of the chassis rail are configured to abut with the surfaces of the chassis rail engaging portion 360.

Each of the chassis rail 200 and chassis rail engaging portion 360 comprise one or more vertical support surfaces. In the exemplary embodiment depicted, the chassis rail 200 includes at least a horizontal surface 206 configured to abut with a complementary horizontal surface 327 of the connector. The exemplary chassis rail 200 further includes another horizontal surface 204 configured to abut with a complementary horizontal surface 329 of the connector. In some embodiments, the horizontal surfaces 204, 206, and 327, 329 are vertically separated so as to create a vertically orientated surface of the connector 326 that is complementary to a vertically orientated surface 205 of the rail 200.

In some embodiments, the horizontal surfaces 204, 206, and 327, 329, and vertically orientated surfaces 326, 205 are located on a lower side of the chassis rail engaging portion 360. In some embodiments, the horizontal surfaces and vertically orientated surfaces are located on an upper side of the chassis rail engaging portion 360. In some embodiments, the horizontal surfaces and vertically orientated surfaces are located on both of the upper side, and lower side as depicted. For example, FIG. 12 and FIG. 14 show surfaces 320, 321, 322, and 201, 202, 203.

The purpose of the vertically and horizontally orientated surface is to vertically and horizontally stabilize the chassis rail engaging portion 360 of the connector 300 inside the channel chassis rail 200 from: rotational or lateral movement of the chassis rail engaging portion 360 within the channel chassis rail 200, yet permit longitudinal movement of the connector within the internal channel of the chassis rail. In this way, the connector 300 may be freely positioned along the longitudinal axis of the chassis rail 200.

In some embodiments, the connector 300 is locked into position by machining an aperture on the complementary vertical faces of the connector 330 and the rail 230 so as to allow a fastener to pass through and lock the components together as shown in FIG. 6.

The cross member engaging region 361 of the connector 300 is shaped to fit within an internal region of the cross member component. For ease of design and construction, it is envisaged the cross section profile of the cross member components 400 may be of any form, such as substantially rectangular. To support engagement with a cross member, the cross member engaging region 361 of the connector 300 comprises an upper surface 324 adapted to engage with an upper surface of an inside channel of the cross member and a lower surface 325 adapted to engage with a lower surface of the inside channel.

In some embodiments, the chassis rail engaging portion 360 and the cross member engaging region 361 each have an alignment axis indicated by dotted lines 301 and 302 respectively. In some embodiments, the alignment axis of the chassis rail engaging portion 360 is offset cross member engaging region 361 so as to direct the angle of extension formed by a cross member relative to the plane defined of the chassis rail. The offset angle is to create clearance for the loads intended to be carried by the trailer. For example, for a boat trailer, it is desirable for the cross members to provide clearance for a boat hull as can be observed by the exemplary embodiment of FIGS. 3 and 5. Vertical surfaces 323 and 326 provide an abutment surface where the cross member is able to fit against the connector and chassis rail.

FIG. 15 shows an alternative form of the connector component 300. In particular, the component has a wider chassis rail engaging region. The wider region may be formed, for example, by cutting section of extrusion, then machining the projecting cross member engaging region to a narrower form so as to conform to the shape and configuration of the engaging cross member. The wider chassis rail engaging region may be provided to improve the stability of the joint created. In some circumstances, the wider chassis rail engaging region may improve stability to twisting or rotating forces, and may also allow wider clearance between the chassis rail and connector. In some embodiments, the chassis rail engaging region is up to 2×, 3×, 4×, or 5× wider than the cross member engaging region.

Figure 16:
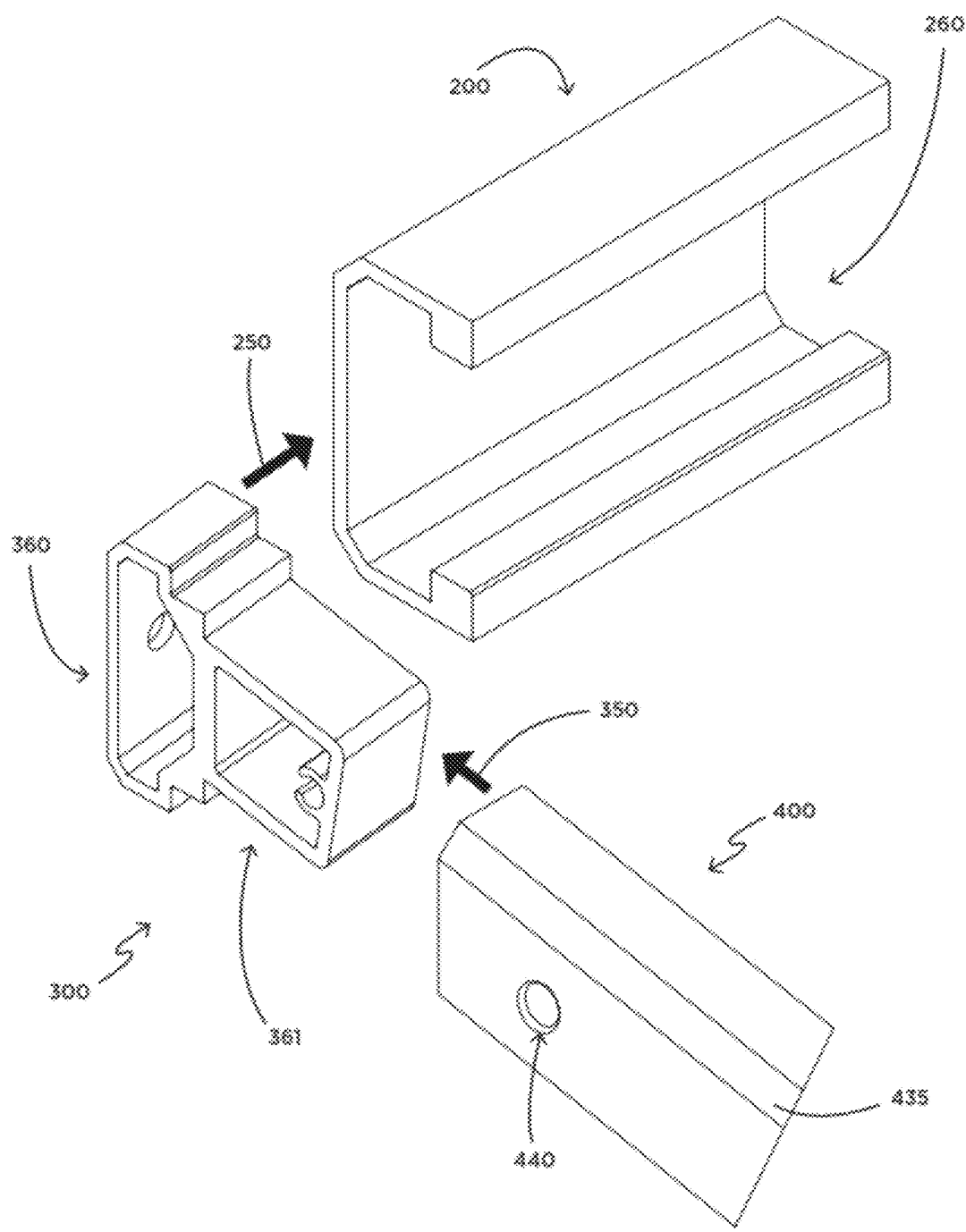
FIG. 16 depicts an assembly process of the chassis rail component.

FIG. 16 depicts an assembly process of the chassis rail component, the connector component, and the cross member component. The components may be connected in any order. The connector end 360 is inserted into the interior channel 260 of the of the chassis rail 200 as indicated by arrow 250. The connector end 361 is further inserted into the interior of the cross member 400 as indicated by arrow 350. In some embodiments, a fastener is inserted through the cross member aperture 440 to engage with the connector and lock the connector and cross member together.

The position of the connector component within the chassis rail is able to be positioned in any point along the length of the rail and will thereby define the position of the cross member. The free positioning of the connector and cross member allows for placement of the cross members to be optimized for the various loads the trailer is intended to transport. For example, some trailers may have a single axle while others may have double or triple axles. The cross members may be positioned to allow optimization of the location of wheel mounts. Further, the free positioning of the cross members and wheel locations allows for the balance point of the trailer to be adjusted to optimize for a desired transported loads. Further, if the location of the cross member ever needs to change, the fastener 310, a new hole in the rail drilled to reposition the fastener, and the fastener configured to secure the connector and cross member in the new location.

The chassis rail and connector, and optionally the cross member are extrusion based. Extrusion facilitates advantages in shipping and transportation of raw materials, and cost advantages through minimization of components required to construct a trailer.

Figure 17:
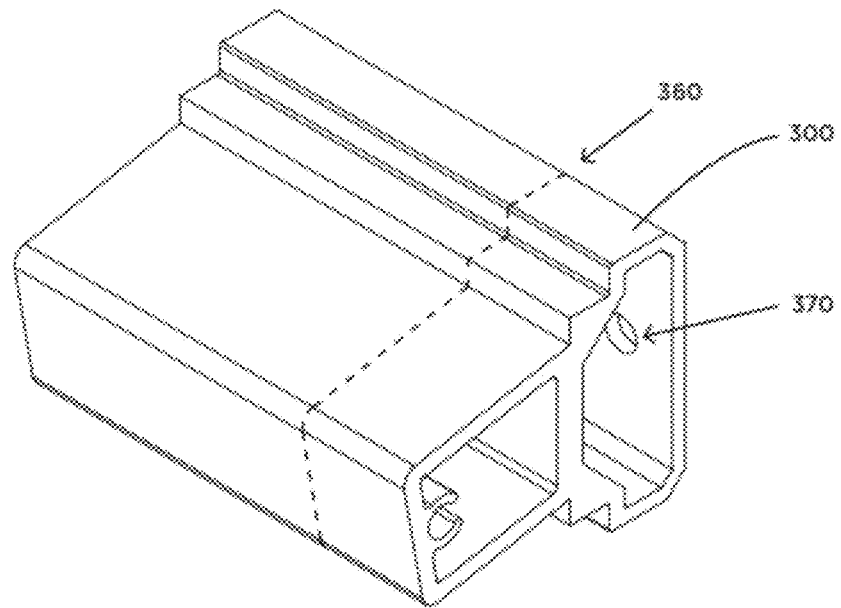
FIG. 17 indicates an extrusion of indeterminate length, where a segment of extrusion is cut at a desired location.

FIG. 17 indicates an extrusion of indeterminate length, where a segment of extrusion is cut at a desired location, such as exemplary location 360, to create the extruded connector component 300. The aperture 370 in the connector component may optionally be machined into the connector 370 such as by drilling to allow a bolt to pass through. Alternatively, self-tapping or self-drilling fasteners may be used.

In some embodiments, a further machining process may be applied to the connector component such as to provide one or more holes for fastener pass-through, or shaping to meet the engagement requirements of the cross member components.

The form of the connector component is exemplary, and formed from a section of extrusion as shown. However, in some embodiments, the connector may be formed by another process such as casting, or machining from billet or rough cast. In other embodiments, the connector component comprises more than one component. For example, the connector component may be assembled from multiple sub components. Having the connector formed as separate smaller pieces may, in some instances, aid with assembly. For example, the connector may be assembled from parts that are small enough to fit within the chassis rail when disassembled, then the connector assembly process creates a larger assembly residing partway within the chassis rail extrusion.

Figure 18:
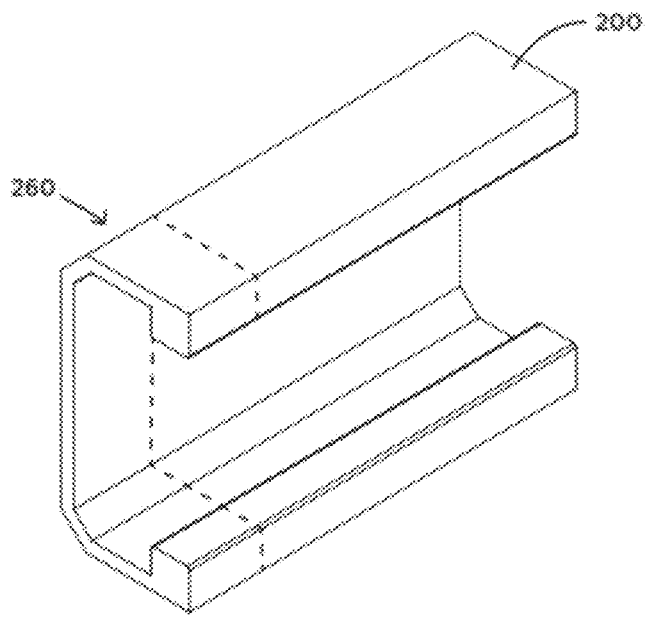
FIG. 18 illustrates an extrusion of indeterminate length, where a segment of the extrusion is cut at a desired location.

FIG. 18 illustrates an extrusion of indeterminate length, where a segment of the extrusion is cut at a desired location, such as exemplary location 260, to create the extruded chassis rail component. The exemplary embodiment depicted has an opening to channel interior to receive the connector component. However, in other embodiments, the chassis rail extrusion has an opening machined into a side wall once an extrusion process has occurred. For example, the chassis rail extrusion may have a box section, and an aperture is formed into a sidewall of the section to allow the connector component to be received. The connector component may comprises multiple pieces to aid installation of the first region within the chassis rail.

The above-described embodiments are exemplary and it should be noted that other shapes and forms of the chassis rail engaging region 360 of the connector 300 are possible which create free longitudinal movement within the channel 260 of the rail 200, yet substantially resist lateral or axial movement.

In some embodiments, the outer profile of the chassis rail engaging region 360 of the connector 300 is complementary to the profile of the inner surface of the chassis rail 200.

In some embodiments, the outer profile of the chassis rail engaging region 360 of the connector 300 and inner profile of the channel 260 of the chassis rail 200 is such that an interlocking arrangement is created, thereby providing free longitudinal movement within the channel of the rail, yet substantially resist lateral or axial movement.

In some embodiments, the outer profile of the cross member engaging region 361 of the connector 300 and inner profile of the channel of the chassis rail 200 are longitudinally complementary thereby providing free longitudinal movement of the cross member engaging region 361 within the channel of the chassis rail, and vertically and laterally noncircular so as to substantially resist lateral or axial movement.

In some embodiments, the outer profile of the cross member engaging region 361 of the connector 300 is complementary to the profile of the inner surface of the cross member 400.

Preferred grades of aluminum are 6005. This grade is typically unsuitable for welding, but can be anodized to combat corrosion. Corrosion protection is particularly useful for trailers that may be exposed to salt water, such as boat trailers. Further, a weldable grade of aluminum material, such as 6061, cannot be suitably anodized.

Figure 19:
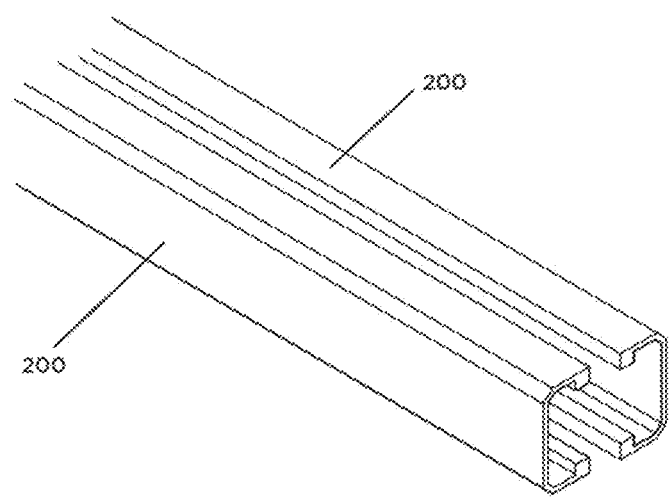
FIG. 19 shows an isometric view of the chassis rail components positioned to form part of a drawbar assembly.

Referring again to FIGS. 4-6, the two chassis rail components are positioned and shaped to form the drawbar region 210 of the trailer. FIG. 19 shows a pair of opposing chassis rail components arranged to form a drawbar for the trailer chassis assembly. Prior art solutions indicate that these components would be welded together. However, for at least the aforementioned reasons, welding is best avoided. To facilitate locking of the two chassis rail components together to form a drawbar, each chassis rail component 200 comprises a longitudinally extending internal channel shaped to form a longitudinally extending enclosure region.

Figure 20:
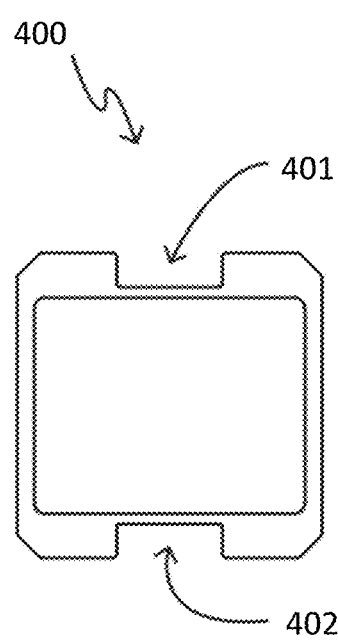
FIG. 20 shows an end view of an exemplary drawbar connector component.

FIG. 20 shows a cross section view of an exemplary drawbar connector component 450. The connector has an outer profile adapted to substantially conform to the internal channel created by the two chassis rail components that are positioned to form a drawbar as exemplified by FIG. 19. In particular, the outer form of the connector is substantially complementary to the inner profile created by adjacent and opposing chassis rails.

In exemplary embodiments, the chassis rail components 200 are substantially C-shaped as described above in detail, and have an open interior channel region and an opening from the interior, the opening extending in the longitudinal axis. FIG. 14 shows a cross section of an exemplary chassis rail component, which includes a vertical downward projection 203 that faces inward and into the internal channel. The projection 203 of each chassis rail 200 create a unitary inward projection when abutted together, and that inward projection fits into at least one complementary recess 401 and/or 402 formed in the outer surface of the drawbar connector 450 when inserted into the internal channel of the chassis rails. In this way, two opposing and abutted chassis rails can be locked together and relative movement or each rail in the horizontal or vertical directions is substantially prevented.

Figure 21:
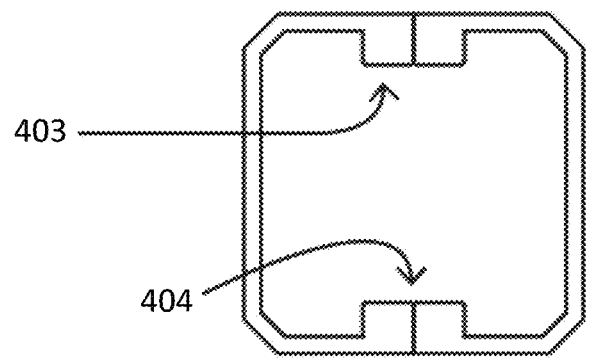
FIG. 21 shows an end of view the chassis rail component positioned to form part of a drawbar assembly.

FIG. 21 shows an end view of the exemplary chassis rail components arranged as part of a drawbar assembly. Each exemplary chassis rail 200 is arranged in an opposing alignment so that the open channel region of each rail faces into the opposing region. The alignment of the opposed open channel regions forms an exemplary tunnel region that extends longitudinally within the exemplary drawbar region 210. Extending into the exemplary tunnel region from each exemplary chassis rail are the inward facing projections 203, 206 which together form a larger inward projecting region 403, 404. The exemplary connector component 300 has an outer profile complementary to that of the arrangement of exemplary chassis rails, and in particular, the outer profile includes recess regions 401, 402 configured for complementary fitment about the inward projecting regions 403, 404 of the drawbar.

Figure 23:
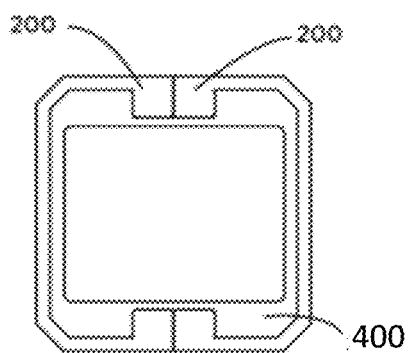
FIG. 23 shows an end view of the chassis rail components and drawbar connector component.

In some embodiments, the chassis rail components have inward facing projections on the upper and lower interior surfaces as depicted by the exemplary embodiment of FIG. 14. For example, a second inward projection comprises of vertical surfaces 205 and 205, and horizontal surface 206. The pair of inward projections is configured to abut when opposing chassis rails are placed in an opposing adjacent arrangement. The interior opening of each channel joins to create an encapsulated interior tunnel. In other embodiments FIG. 23 is an end view of the assembled exemplary chassis rail components 200 and the exemplary connector component 450. The exemplary connector 300 includes recess regions 401, 402 of the connector 450 are adapted to prevent lateral misalignment of the chassis rails 200 once assembled. The connector 450 is free to move through the tunnel formed by the chassis rails, and substantially locks the chassis rails in the lateral and vertical planes.

Figure 22:
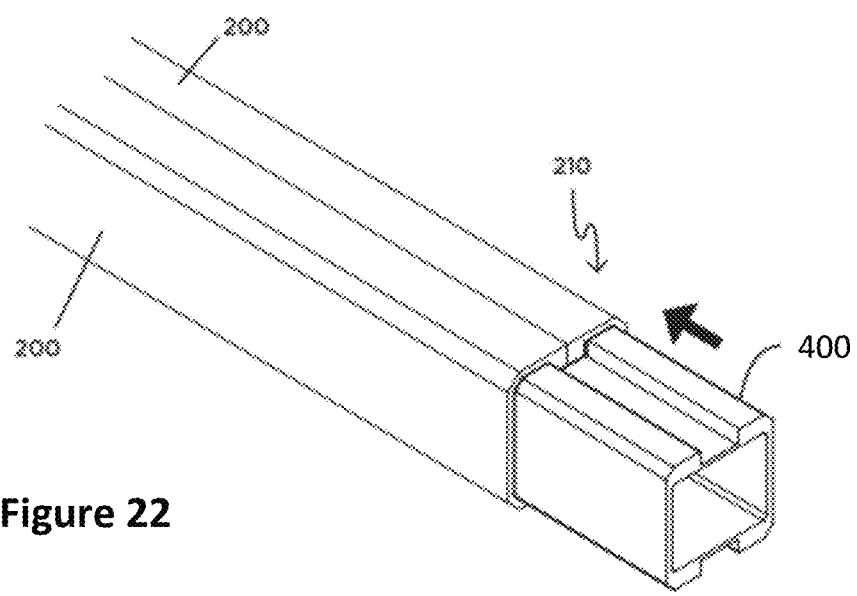
FIG. 22 an isometric view of an isometric view of the drawbar connector component positioned for engagement with the chassis rail components.

FIG. 22 shows an isometric view of the exemplary drawbar 210 and the connector 450, and generally indicates an assembly process for the drawbar region. In particular, the assembly process has a step where the connector 450 is inserted into the open end of the tunnel formed by the drawbar region 210 of the chassis rails 200 as indicated by the arrow.

To secure the pair of chassis rails and connector, a single fastener may pass through the assembly, or alternatively, one fastener may connect one chassis rail to the connector, and another fastener connect the other chassis rail to the connector.

Figure 24:
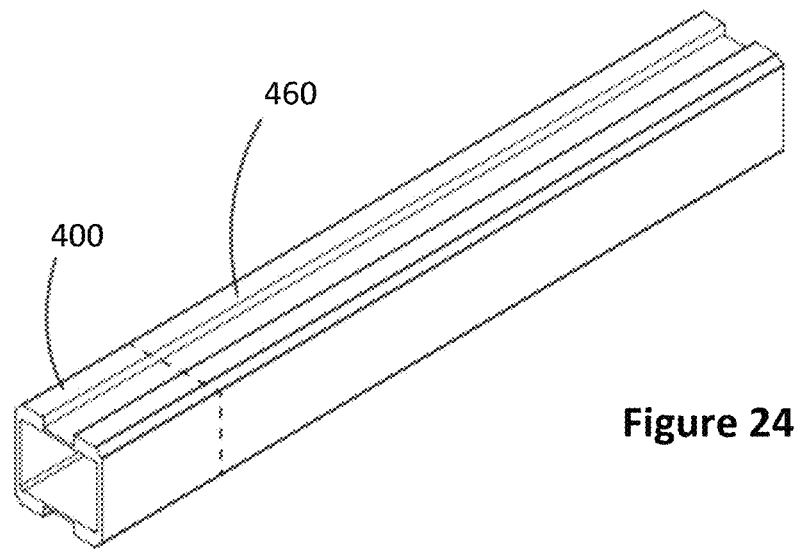
FIG. 24 illustrates an extrusion of indeterminate length, where a segment of the extrusion is cut at a desired location to create a drawbar connector component.

FIG. 24 indicates an extrusion 460 of indeterminate length, where a segment of extrusion is cut at a desired location to create a connector component 450. The chassis rails may be bent into shape at regions 220, 230 so as to allow a single continuous length of extrusion from the rearmost part of the trailer chassis, and all the way forward to the drawbar region. Further, the continuous length of extrusion is further joined together by the connector in the drawbar region of the trailer chassis to thereby form the completed drawbar of the trailer. A tow coupling, winch mount, jockey wheel, and other components may be attached to the drawbar as desired.

Further, the connector component acts to increase the material thickness of the chassis components in the drawbar region of the trailer. This provides a substantial improvement in the construction strength of the drawbar.

Those skilled in the art will appreciate that other forms of the outer profile of the connector components, and internal profile of the chassis rail components are possible while still achieving the benefits of the invention. In particular, the internal profile of the chassis rail must have at least one inward projection tangential to the plane where the channel opening is formed. In this way, the inward projection will act to prevent lateral separation of the chassis rails once the connector component has been inserted.

In the exemplary embodiment shown, the drawbar connector 450 is configured with an outer surface that is substantially complimentary to the inner surface of adjacent positioned chassis rail components, which in turn form a hollow enclosed interior when bought together. However, many other forms are possible. For example, the drawbar connector component 450 may instead by configured with an interior surface that is complimentary to the outer surface form of the drawbar formed by the adjacent chassis rail components, and form an outer sleeve over the chassis rails instead of an inner sleeve.

Further, it is desirable for the chassis rails to be arranged laterally adjacent, hence the channel opening of each rail is desirably disposed to face laterally. Accordingly, the inward projections of each chassis rail inner profile are ideally located to project on the vertical plane. Similarly, the recess in the outer profile of the connector is complementary to the location of the inward projections of each chassis rail.

In some embodiments, the inner profile of each chassis rail has at least one inward facing, vertically orientated projection. In some embodiments, the inner profile of each chassis rail has at least two inward facing, vertically orientated projections. In some embodiments, the chassis rail has at least two inward facing, vertically orientated projections and whereby one projection is located on an upper surface, and the other is located on the lower surface. In some embodiments, the outer profile of the connector is complementary to the at least two vertically orientated projections.

Where in the foregoing description reference has been made to elements or integers having known equivalents, then such equivalents are included as if they were individually set forth. Although the invention has been described by way of example and with reference to particular embodiments, it is to be understood that modifications and/or improvements may be made without departing from the scope of the invention as set out in the claims.

What is claimed is:

1. A trailer chassis assembly comprising:
an extruded chassis rail component comprising a wall surface defining an interior channel space and an opening in the wall surface extending through the wall surface to the interior channel space;
a cross member component; and
a connector component comprising:
a unitary section of extrusion formed as a one-piece, monolithic structure, comprising:
a first region adapted to engage with the interior channel space of the extruded chassis rail component, and
a second region adapted to engage with the cross member component,
wherein the interior channel space of the extruded chassis rail component and first region of the connector component are adapted to capture movement of the first region of the connector component in vertical and horizontal planes, and yields movement in an axial plane.

2. The trailer chassis assembly of claim 1, wherein the interior channel space of the extruded chassis rail component extends longitudinally to a channel opening disposed at, at least, one end.

3. The trailer chassis assembly of claim 1, wherein the cross member component is a section of extrusion.

4. The trailer chassis assembly of claim 1, wherein the connector component is adapted to extend through the opening in the extruded chassis rail component to thereby engage with the cross member component.

5. The trailer chassis assembly claim 1, wherein the extruded chassis rail component comprises a rear vertical wall, a top lateral wall, a bottom lateral wall, and first and second wall sections extending vertically together from each of the top lateral wall and the bottom lateral wall, the first and second wall sections defining the opening to the interior channel space.

6. The trailer chassis assembly of claim 5, wherein the first region of the connector component is adapted to engage with the top lateral wall, the bottom lateral wall, and the first and second wall sections.

7. The trailer chassis assembly of claim 1, wherein an outer profile of the first region of the connector component is substantially complementary to a profile of an inner surface of the extruded chassis rail component with which it resides when assembled.

8. The trailer chassis assembly of claim 1, wherein an outer profile of the second region of the connector component is adapted for engagement with the cross member component.

9. The trailer chassis assembly of claim 1, wherein an outer profile of the first region of the connector component is substantially adapted for lateral and vertical engagement with an inner surface of the extruded chassis rail component, yet adapted for free longitudinal movement about the interior channel space of the extruded chassis rail component.

10. The trailer chassis assembly of claim 1, wherein an outer profile of the first region of the connector component is adapted to interlock with the extruded chassis rail component in lateral and vertical axes.

11. The trailer chassis assembly of claim 1, wherein the second region of the connector component is complementary to a profile of a surface of the cross member component.

12. The trailer chassis assembly of claim 1, wherein axial profile of the interior channel space of the extruded chassis rail component substantially matches the axial profile of an exterior of the connector component configured for engagement with the extruded chassis rail component.

13. The trailer chassis assembly of claim 12, wherein the axial profile of the interior channel space of the extruded chassis rail component comprises at least one vertical support surface interspersed between horizontally orientated support surfaces.

14. The trailer chassis assembly of claim 12, wherein the axial profile of the interior channel space of the extruded chassis rail component comprises at least one horizontal support surface interspersed between vertically orientated support surfaces.

15. The trailer chassis assembly of claim 1, wherein the cross member component comprises a substantially tubular form having a hollow interior adapted to receive the second region of the connector component to thereby capture movement of the second region of the connector component in vertical and horizontal planes, and yields movement in the axial plane.

16. The trailer chassis assembly of claim 1, further comprising:
two laterally opposed chassis rail components;
one or more cross member components adapted to span between the two laterally opposed chassis rail components; and
connector components adapted to interconnect each end of the one or more cross member components and the two laterally opposed chassis rail components.

17. The trailer chassis assembly of claim 1, further comprising a fastener adapted to secure the connector component to the extruded chassis rail component.

18. The trailer chassis assembly of claim 1, further comprising a fastener adapted to secure the connector component to the cross member component.

19. The trailer chassis assembly of claim 1, further comprising:
a pair of extruded chassis rail components arranged with at least one abutting surface; and
a drawbar connector component configured to concentrically engage the pair of chassis rail components so as to laterally and vertically stabilize the chassis rail components.

20. The trailer chassis assembly of claim 19, wherein the drawbar connector component is a section of extrusion.

21. A trailer chassis assembly comprising:
an extruded chassis rail component, comprising:
a wall surface defining an interior channel space, the wall surface comprising:
an opening extending through the wall surface to the interior channel space;
a rear vertical wall;
a top lateral wall;
a bottom lateral wall;
a first wall section extending vertically from the top lateral wall; and
the bottom wall extending vertically from the bottom lateral wall,
wherein the first wall section and the second wall section define the opening to the interior channel space;
a cross member component; and
a connector component, comprising:
a unitary section of extrusion, comprising:
a first region adapted to engage with the interior channel space of the extruded chassis rail component; and a second region adapted to engage with the cross member component;

wherein the interior channel space of the chassis rail component and first region of the connector component are adapted to capture movement of the first region of the connector component in vertical and horizontal planes, and yields movement in the axial plane.

\* \* \* \* \*